(12) United States Patent
Heie

(10) Patent No.: US 6,675,028 B1
(45) Date of Patent: Jan. 6, 2004

(54) MOBILE STATION USER INTERFACE, AND AN ASSOCIATED METHOD, FOR FACILITATING USAGE BY A VISUALLY-IMPAIRED USER

(75) Inventor: Anders Fahnøe Heie, San Diego, CA (US)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/563,377

(22) Filed: May 3, 2000

(51) Int. Cl.[7] ................................................. H04B 1/38
(52) U.S. Cl. ........................................ 455/575; 434/113
(58) Field of Search ............................ 379/52; 455/575, 455/414, 557; 345/108; 434/112, 113, 114, 115, 116, 117

(56) References Cited

U.S. PATENT DOCUMENTS 6,278,441 B1 * 8/2001 Gouzman et al. ........... 345/163

FOREIGN PATENT DOCUMENTS

| DE | 299 19 123 | | 3/2001 | |
|----|---|---|---|---|
| JP | 04014331 | | 1/1992 | |
| JP | 10-190804 | * | 7/1998 | ............ H04M/1/23 |
| JP | 11075234 | | 3/1999 | |

* cited by examiner

Primary Examiner—Nay Maung
Assistant Examiner—Tu Nguyen
(74) Attorney, Agent, or Firm—Milan I. Patel

(57) ABSTRACT

Apparatus, and an associated method, for facilitating use of a mobile station by a visually-impaired user. A data message, such as a SMS (Short Message Service) message provided to the mobile station during operation of the radio communication system in which the mobile station is operable is converted into Braille patterns readable by a visually-impaired user of the mobile station.

14 Claims, 3 Drawing Sheets

MOBILE STATION USER INTERFACE, AND AN ASSOCIATED METHOD, FOR FACILITATING USAGE BY A VISUALLY-IMPAIRED USER

The present invention relates generally to a user interface for a mobile station operable in a radio communication system, such as a cellular communication system. More particularly, the present invention relates to a user interface, and an associated method, for facilitating its usage by a visually-impaired user. Through operation of an embodiment of the present invention, data received at the mobile station is displayable in Braille form as Braille patterns, scrollable across a Braille keypad at a desired scrolling rate.

BACKGROUND OF THE INVENTION

The use of multi-user, radio communication systems has achieved wide popularity in recent years as advancements in communication technologies have permitted the implementation of such radio communication systems to be affordably utilized by large members of users.

In a radio communication system, a communication channel connecting a sending station with a receiving station is formed of a radio communication channel. A radio communication channel is defined upon a portion of the electromagnetic spectrum. Because a radio communication channel is used to communicate communication signals between the sending and receiving stations, a conventional wireline connection, required by conventional wireline communication systems, is not utilized to communicate the communication signals between the sending and receiving stations. Communication by way of a radio communication system, therefore, is of particular advantage when formation of a wireline connection between sending and receiving stations would be impractical.

A sending station of a radio communication system is operable to convert information which is to be communicated to the receiving station into a communication signal of characteristics which permits its communication upon the radio communication channel. To convert the information into such a communication signal, the sending station modulates the information signal upon a carrier wave of a carrier frequency within the range of frequencies which defines, at least in part, the communication channel. A radio device which provides both a sending station and a receiving station at a common unit is sometimes referred to as radio transceiver. Two-way communication is permitted through the use of a radio transceiver.

A cellular communication system is exemplary of a multi-user radio communication system, usage of which has achieved wide popularity in recent years. When a user communicates by way of a radio transceiver, typically referred to as a mobile station, the mobile station is constructed to mimic the operation of a conventional, wireline, telephonic device. Because telephonic communication is effectuated without the need of a wireline connection with the mobile station, the mobile station can be utilized to effectuate telephonic communications from locations at which formation of a wireline connection would be inconvenient or impractical.

Digital communication techniques have facilitated the communication of non-voice data in a cellular, or other radio, communication system. Non-voice data forming, e.g., e-mail messages, SMS (Short Message Service) messages, and the like, are all exemplary of non-voice data that can be communicated to and with a mobile station operable in various types of cellular communication systems. Conventionally, such messages are displayed upon a visual display device of the mobile station. The visual display device is formed, e.g., of a liquid crystal display. The user of the mobile station is thereby able to read the message once displayed upon the display device.

Visually-impaired users, however, are unable to read the message displayed upon the display device. And, as a result, a visually-impaired user is generally unable to make use of data messaging services provided in many cellular communication systems.

While Braille readers are available to convert data text, such as ASCII text into Braille form to permit reading by a visually-impaired user, conventional Braille readers are generally of large physical dimensions and also not generally available for use in conjunction with a cellular, or other, mobile station. With increased miniaturization of the packaging of mobile stations, many mobile stations are of physical dimensions permitting their carriage in a shirt pocket, or the like, of a user. Even if a conventional Braille reader could be adapted for use to read out a data message received at a mobile station in Braille form, the relatively bulky dimensions of most available Braille readers would obviate, to a great extent, the portability permitted of many mobile stations.

If a manner could be provided by which to convert a data message received at a mobile station into Braille form, use of data messaging services by a visually-impaired user of the mobile station would be facilitated.

It is in light of this background information related to user interfaces for mobile stations that the significant improvements of the present invention have evolved.

SUMMARY OF THE INVENTION

The present invention, accordingly, advantageously provides a user interface, and an associated method, for a mobile station to facilitate usage of the mobile station by a visually-impaired user. Operation of an embodiment of the present invention facilitates a visually-impaired person's use of the mobile station to receive data messages sent to the mobile station pursuant to a data messaging service.

In one aspect of the present invention, a Braille keypad is provided for use in conjunction with a portable, mobile station. A controller is coupled to receive indications of a data message received at the mobile station. The controller converts the data message into alphanumeric characters representative of the data message. An array of upstanding pin members is connected to the controller. Each pin number is alternately positionable in a recessed position or an upstanding position. Sets of pin members of the array formed of three rows and two columns of pin members together define Braille patterns. The controller is operable to cause positioning of individual ones of the pin members of one or more of such sets to form a Braille pattern corresponding to the alphanumeric character into which the indication of the data message is converted. The Braille pattern corresponding to the alphanumeric character is formed by selectably causing positioning of individual ones of the pin members of the set of pin members to be positioned in the upraised or recessed positions, as appropriate, to form a Braille pattern corresponding to the alphanumeric character. Successive ones of the alphanumeric characters into which the data message is converted by the converter are analogously successively displayed as Braille patterns, thereby to permit a visually-impaired user of the mobile station to read the data message in Braille form.

In another aspect of the present invention, the array of upstanding pin members is divided into a series of horizontally-positioned sets of pin members, each set of which is formed of a number of rows and columns to permit formation of a Braille pattern thereat. A converter is coupled to receive indications of a data message received at the mobile station pursuant to a data messaging service. The converter converts the indications of the data message into alphanumeric characters. Successive ones of the alphanumeric characters are then caused by the converter to be displayed in the form of Braille patterns at the successive ones of the sets of pin members into which the array of pin members is divided. Thereby, a plurality of Braille patterns corresponding to a plurality of alphanumeric characters of the data message are displayed.

In another aspect of the present invention, the Braille patterns displayed upon the successive one of the sets of pin members of the array of pin members are caused by the controller to scroll across the array, e.g., in a ticker-type scroll display. An input actuator positioned proximate to the array of pin members permits the user of the mobile station to control the scrolling rate at which the Braille patterns scroll across the sets of pin members. In one implementation, the direction, as well as the rate, of the scrolling of the Braille patterns is controllable in this manner.

In another aspect of the present invention, the array of pin members are positioned upon a support member which seats upon a housing surface of the mobile station in releasable engagement therewith. The support member, together with the array of pin members, forms an assembly which, when properly seated upon the housing of the mobile station, forms a single unit. That is to say, the assembly, together with the mobile station are together carriable by the user of the mobile station as a common package. In one implementation, the controller is also supported by the support member, and the controller is coupled to the radio circuitry housed within the housing of the mobile station by way of a plug connector connecting the controller with the radio circuitry. In another implementation, the controller is housed within the housing of the mobile station, and the array of pin members are coupled to the controller by way of the plugged controller.

In one implementation, the support member seats upon the housing of the mobile station to be positioned above a soft key of the user interface of the mobile station. Translation forces exerted by the user of the mobile station upon a set of the pin members of the array of pin members causes, in turn, the soft key of the mobile station to actuate a selected function of the mobile station. Thereby, the assembly which provides for display of data messages in Braille form can also be utilized as an input actuator to initiate actuation of input functions. Thereby, a visually-impaired user of the mobile station is able both to read data messages received at the mobile station and also to enter more easily input commands to the mobile station.

Alternately, detection is made at the Braille keypad of the generation of translation force thereon. Responsive thereto, an electrical signal is generated and provided to the circuitry of the mobile station. That is to say, a logical detection is made of the translation force applied to the keypad.

In these and other aspects, therefore, user interface apparatus, and an associated method, is provided for a radio device operable in a radio communication system. The user interface apparatus, and the associated method, facilitates use of the radio device by a visually-impaired user. A plurality of upstanding pin members are arranged in rows and columns to form an array. Each upstanding pin member is separately positionable alternately in an upraised position and a recessed position. The array formed of the plurality of upstanding pin members includes at least a first set of pin members capable of forming a first Braille pattern. A controller is coupled to the plurality of upstanding pin members and to receive indications of data provided to the radio device generated during operation of the radio communication system. The controller selectably causes positioning of the upstanding pin members of the set of pin members to form the first Braille pattern. The first Braille pattern is of a character responsive to values of a portion of the data.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
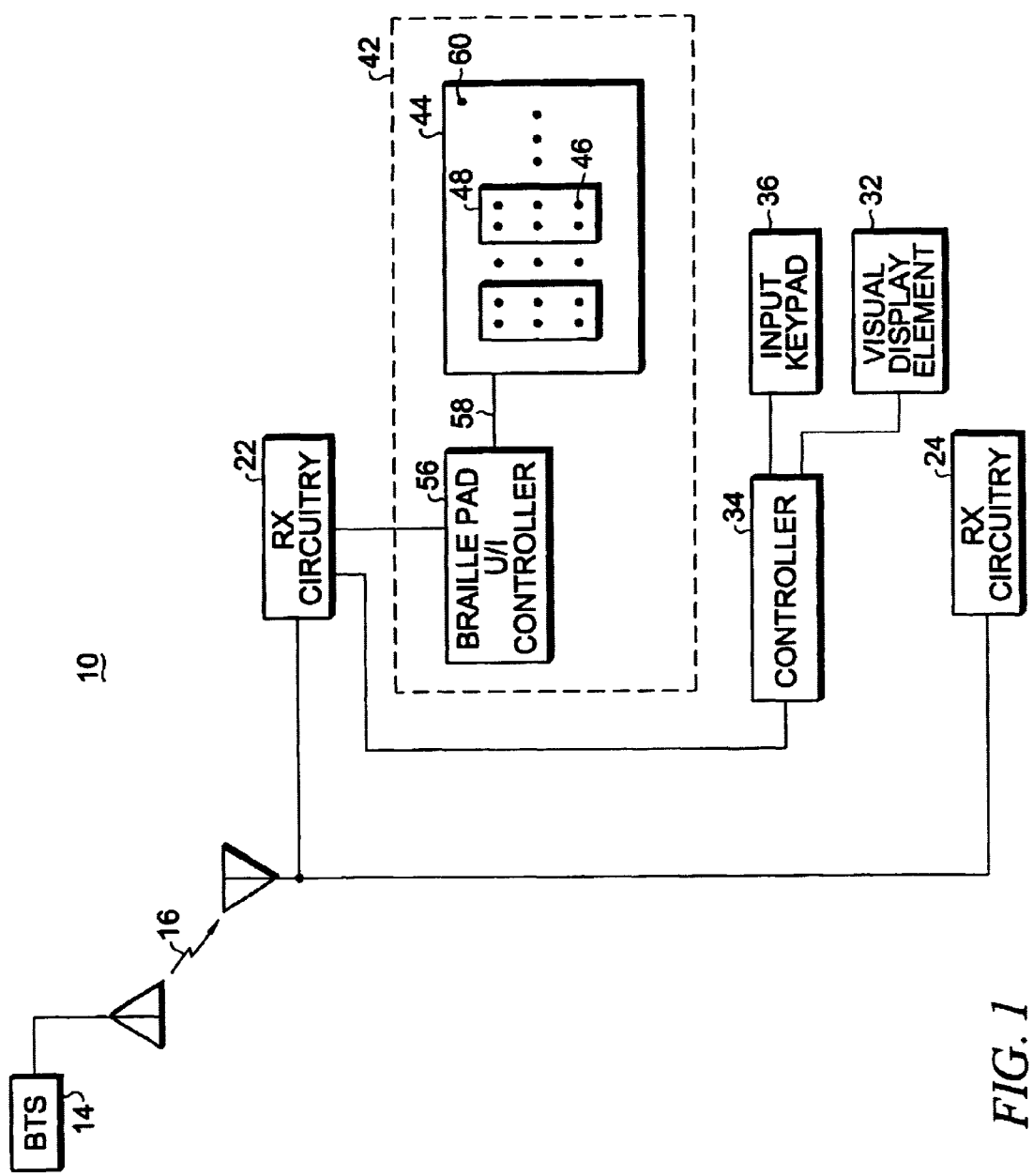
FIG. 1 illustrates a functional block diagram of a mobile station including an embodiment of the present invention, operable in a radio communication system.

Referring first to FIG. 1, a portion of the radio communication system, shown generally at 10, provides for radio communications with a mobile station 12. Two-way communications with the mobile station are permitted during operation of the communication system 10. Here, a Base Transceiver Station (BTS) 14 forming a portion of the network infrastructure is operable to transceive communication signals with the mobile station 12. Communication signals are communicated between the base transceiver station and the mobile station by way of a radio link 16 formed between the base transceiver station and the mobile station.

During operation of the radio communication system, data messages pursuant to a data messaging service are sent by the network infrastructure of the communication system upon the radio link 16 to the mobile station 12. For instance, when the radio communication system forms a GSM (Global System for Mobile communications) communication system which provides for SMS (Short Message Service) messaging, the network infrastructure is capable of generating SMS messages for communication to the mobile station. The mobile station is also, conversely, capable of sending SMS messages to the network infrastructure. While the description shall, at times, describe the mobile station with respect to exemplary operation thereof in a GSM cellular communication system, operation of an embodiment of the present invention is analogously operable in other types of cellular, or other radio, communication systems.

The mobile station is here shown to include receive circuitry 22 and transmit circuitry 24. Both the receive circuitry 22 and the transmit circuitry 24 are coupled to a transducer 26 operable to receive electromagnetic signals transmitted upon the radio link 16 to the mobile station and to transduce electrical signals generated by the transmit circuitry into electromagnetic form. The receive circuitry is operable generally in conventional manner to perform receive operations upon signals received at the mobile station. The transmit circuitry is also generally operable in conventional manner to perform transmit operations to form transmit signals for transmission upon the radio link to the network infrastructure of the communication system.

Amongst the communication signals upon which the receive circuitry operates includes data messages, such as the aforementioned SMS messages. The mobile station 12 is here shown further to include a visual display element 32, conventionally utilized to display in visual form the informational content of the message received at the mobile station. The visual display element 32 is here shown to be coupled to the receive circuitry 22 by way of a controller 34. The controller is also coupled to an input keypad 36. User actuation of selected actuation keys of the input actuation keypad 36 generates user input signals used by the controller to control operation of the mobile station.

While display of the data messages received at the mobile station upon the visual display element provides a convenient manner by which many users of the mobile station are able in a convenient manner to review the informational content of the data message, visually-impaired users of the mobile station are not correspondingly able to view the message upon the visual display element. Operation of an embodiment of the present invention provides a manner by which better to provide the information contained in the data message to a visually-impaired user of the mobile station.

The mobile station 12, accordingly, further includes user interface apparatus 42 of an embodiment of the present invention. The user interface apparatus 42 is operable to display data messages such as a SMS message, in Braille form, thereby to permit a visually-impaired user of the mobile station to read the data message.

The user interface apparatus 42 includes an array 44 of upstanding pin members 46. The pin members 46 are arranged in rows and columns, together to form the array of pin members. In the exemplary implementation, adjacent ones of the pin members are positioned in both horizontal and vertical directions at common distances from one another. And, during operation of an embodiment of the present invention, the array of pin members are divided into sets 48 of pin members. Each set is formed of a number of pin members to permit the sets to form a Braille pattern. Namely, each set 48 of pin members is formed of three rows and two columns of pin members. By causing selected ones of the pin members to be either in the upstanding or recessed positions, a Braille pattern corresponding to an alphanumeric pattern is formable. While, for purposes of illustration, the sets are formed of 3×2 arrays, additional pins can be utilized to form each set, thereby to increase the resolution of the display and to facilitate resolution of scrolling, as shall be described below, of Braille patterns.

In the exemplary embodiment, the sets 48 are separated by single columns 52 of pin members. The columns 52 thereby define the separation between the adjacent ones of the sets 48 of pin members.

The array of pin members is connected to a Braille pad user interface controller 56. The controller 56 is, in turn, coupled to the receive circuitry 22. The controller 56 is coupled to receive indications of data messages, such as SMS messages, received at the mobile station. The controller 56 converts the indications of the data messages received at the mobile station into alphanumeric characters. And, the controller 56 then generates control signals on the lines 58 to cause selectably translation of individual ones of the pin members of the sets 48 to form the Braille pattern corresponding to the alphanumeric characters.

In one implementation, the Braille patterns are displayed at successive ones of the sets 48 during successive time periods, thereby to cause scrolling of the Braille pattern through the array of pin members. By converting the alphanumeric characters of which the data message is formed into Braille patterns, a visually-impaired user of the mobile station is able to read the data message provided to the mobile station. An actuator, here represented by the key 60, is actuable by the user to control the scrolling rate, as well as the direction of the scrolling.

Figure 2:
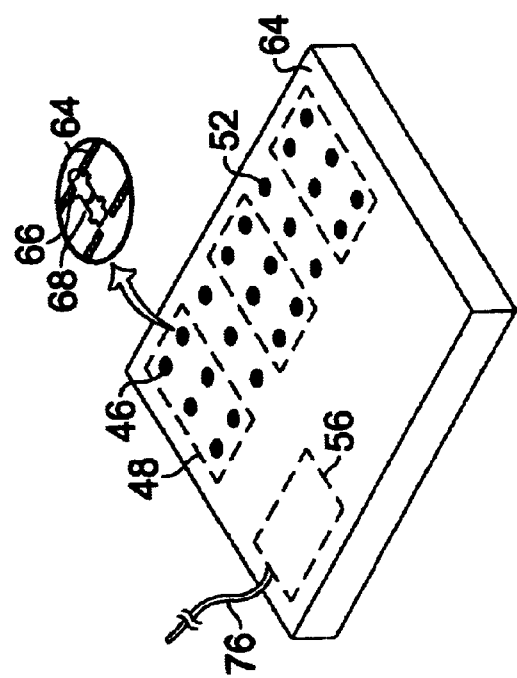
FIG. 2 illustrates a partial functional, partial perspective view of a portion of the user interface apparatus of an embodiment of the present invention.

Turning next to FIG. 2, the array 44 forming a portion of the user interface apparatus 42 shown in FIG. 1 is again shown to include a plurality of pin members 46 positioned in rows and columns to define the array of pin members. The sets 48 and columns 52 into which the pin members are divided. In the implementation shown in the figure, a single row of sets 46 of pin members are utilized. In other implementations, greater numbers of rows of sets of pin members are formed of the array of pin members.

Each of the pin members of the array is supported in position by a support member 64. The support member is formed, for example, of a thermoplastic material having vertically-extending apertures extending therethrough and into which the pin members are inserted. The enlarged view of a single pin member 46 illustrates the positioning of the pin member to extend through an aperture extending through the support member. Radially-extending flanges 66 and 68 limit translation of the pin member in, and opposite to, the direction of the arrow 72.

A coil 74 is also shown to be wrapped about the pin member. The coil is selectably energized, or caused not to be energized, by the controller 58. Through selective energization of the coil 74, translation of the pin member associated therewith is selectably effectuated. The controller 58, in one implementation, is mounted together with the support member 64, and the controller 56, in turn, is connected to the receive circuitry 22 (shown in FIG. 1) by way of a plug connector 76. In another implementation, the controller 56 is embodied within the housing of the mobile station. In such an implementation, the plug connector 76 extends to the pin members, or the coils thereabout, and the controller within the housing of the mobile station.

Figure 3:
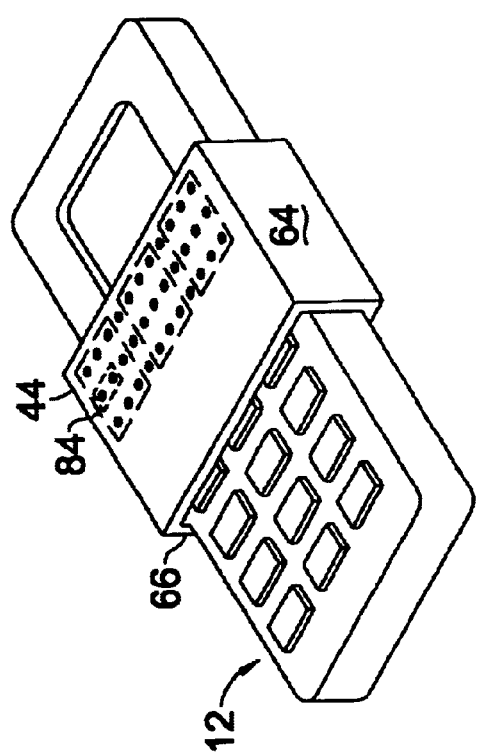
FIG. 3 illustrates an exploded, perspective view of the user interface apparatus of an embodiment of the present invention positioned together with a mobile station to be operable therewith.

FIG. 3 illustrates the support member 64 seated upon a housing face surface 82 of the housing of the mobile station 12. The support member includes an affixing mechanism, such as clip members integrally formed together with the support member to clippingly engage the support member to the side edge portions of the housing of the mobile station.

By appropriate positioning of the support member 64 upon the face surface 82 of the housing, a set 46 of pin members is positioned to abut against a soft key 84 of the conventional actuator keypad of the mobile station. By positioning the pin members of the set 46 in such manner, application of an actuation force on the pin members 46 of the set 48 causes actuation forces to be applied to the soft key 84. Through appropriate software executable within the controller 34 (shown in FIG. 1), actuation of the soft key 84 initiates selected functioning of the mobile station. In this manner, thereby, the user interface apparatus 42 is also used as an input entry device as well as a Braille pattern display device.

Figure 4:
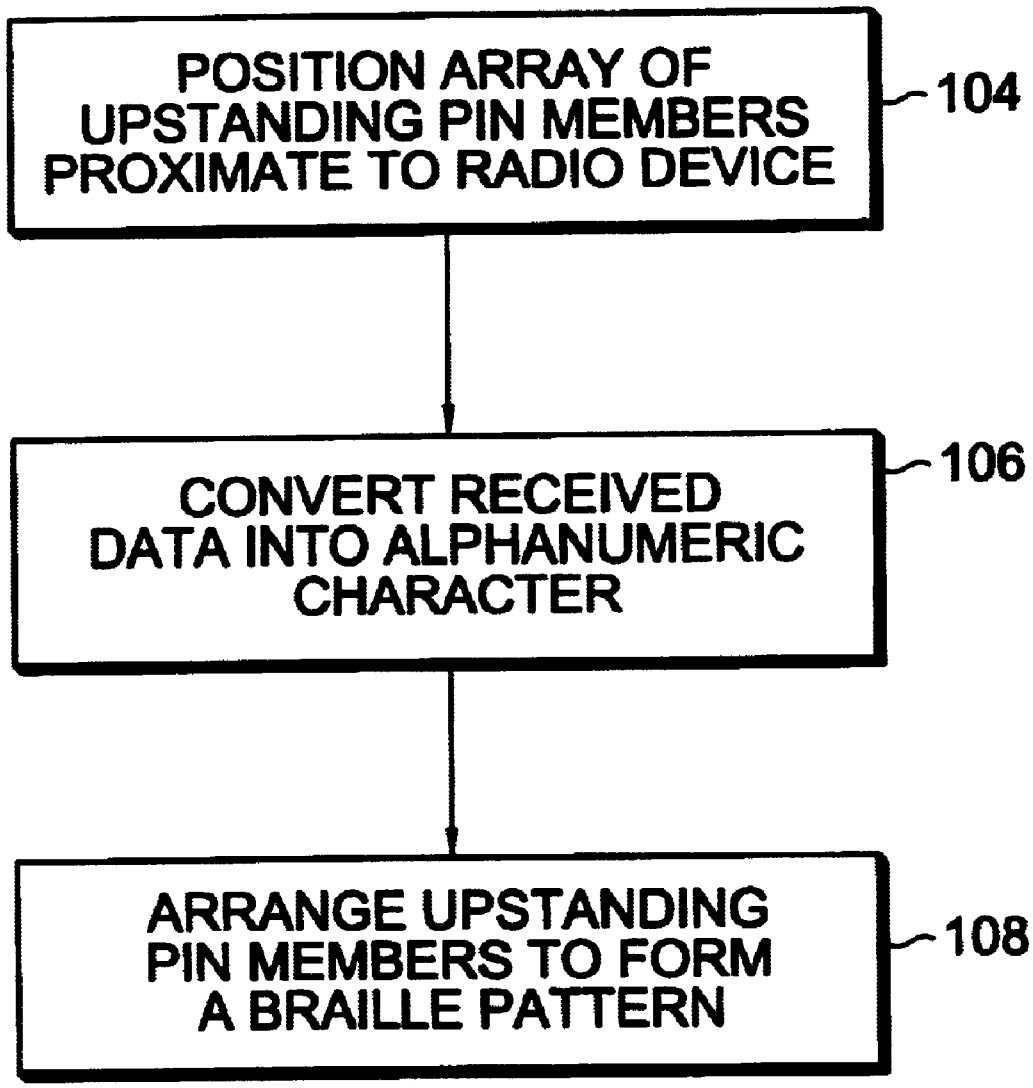
FIG. 4 illustrates a method flow diagram listing a method of operation of an embodiment of the present invention.

FIG. 4 illustrates a method, shown generally at 102, which facilitates use of a radio device by a visually-impaired user.

First, and as indicated by the block 104, an array of upstanding pin members are positioned proximate to the radio device. The pin members are arranged in rows and columns to form an array. Each pin member is separately positionable alternately in an upraised position and a recessed position. The array defines at least a first set of pin members capable of forming at least a first Braille pattern.

Then, and as indicated by the block 106, the data received at the radio device is converted into at least a first alphanumeric character. And, as indicated by the block 108, the pin members of the first set of pin members are caused to be selectably positioned in the upraised and recessed positions, together to form a Braille pattern, the Braille pattern so-formed corresponds to the first alphanumeric character.

Thereby, a manner is provided by which to display a data message sent to the mobile station in Braille form. A visually-impaired user of the mobile station is thereby able to read the data message.

The previous descriptions are of preferred examples for implementing the invention, and the scope of the invention should not necessarily be limited by this description. The scope of the present invention is defined by the following claims.

I claim:

1. In a radio device operable in a radio communication system, an improvement of user interface apparatus for facilitating use of the radio device by a visually-impaired user, said apparatus comprising:

a plurality of upstanding pin members arranged in rows and columns to form an array, each upstanding pin member separately positionable alternately in an upraised position and a recessed position, the array formed of said plurality of the upstanding pin members including at least a first set of pin members capable of forming a first Braille pattern;

the at least the first set of pin members comprises the first set of pin members and at least a second set of pin members, the first set of pin members capable of forming the first Braille pattern and the second set of pin members capable of forming a second Braille pattern;

the first set of the pin members comprise a first subarray of the array formed of said plurality of pin members and wherein the second net of the pin members comprises a second subarray of the array formed of said plurality of pin members, the first subarray and the second subarray separated by at least one column of pins of the array; and a controller coupled to said plurality of upstanding pin members and to receive indications of data provided to the radio device generated during operation of the radio communication system, said controller for delectably causing positioning of the upstanding pin members of the set of pin members to form the first Braille pattern, the first Braille pattern of a character responsive to values of a portion of the data.

2. The user interface apparatus of claim 1 wherein the first set of pin members and the second set of pin members are positioned horizontally relative to one another.

3. The user interface apparatus of claim 1 further comprising a support member for supporting each of the pin members of said plurality in the rows and columns to form the array, said support member, together with said plurality of pin members, connectable to the radio device.

4. The user interface apparatus of claim 3 wherein the radio device comprises radio circuitry housed within a housing, the housing having a face surface, and wherein said support member is positioned at the face surface of the housing.

5. The user interface apparatus of claim 4 wherein said controller is housed within the housing of the radio device, the user interface apparatus further comprising a connector for connecting said plurality of pin members with said controller.

6. The user interface apparatus of claim 4 wherein said controller is positioned beyond the housing of the radio device, the user interface apparatus further comprising a connector for connecting said controller to the radio circuitry housed within the housing.

7. The user interface apparatus of claim 4 wherein the radio device further comprises a user actuation input key positioned at the face surface of the housing and wherein said support member is positioned such that the first set of the pin members seat upon the user actuation input key, exertion of an actuation force upon the pin members of the first set causing actuation of the user actuation input key.

8. The user interface apparatus of claim 7 wherein the radio device is operable in a first mode and at least a second mode and wherein actuation of the user actuation input key through exertion of the actuation force upon the pin members of the first set causing a first type of radio device action when the radio device is operated in the first mode and a second type of radio device action when the radio device is operated in the second mode.

9. In a method for communicating in a radio communication system utilizing a portable radio device, an improvement of a method for facilitating use of the radio device by a visually-impaired user, said method comprising positioning an array of upstanding pin members proximate to the radio device, the pin members arranged in rows and columns to form an array, each pin member separately positionable alternately in an upraised position and a recessed position, the array defining at least a first set of pin members capable of forming at least a first Braille pattern; wherein the at least the first set of pin members defined by the array of pin members positioned during said operation of positioning comprises the first set of pin members capable of forming a Braille pattern and at least a second set of pin members also capable of forming a Braille pattern;

converting data received at the radio device into at least a first alphanumeric character, wherein the at least the first alphanumeric character into which the data is converted during said operation of converting comprises the first alphanumeric character and at least a second alphanumeric character; and causing the pin members of the first set of pin members to be selectably in the upraised and recessed positions, together to form a Braille pattern, the Braille pattern corresponding to the first alphanumeric character; wherein said operation of causing comprises, during a first time period, causing the first Braille pattern to be formed at the first set of pin members and the second Braille pattern to be formed at the second set of pin members.

10. The method of claim 9 wherein the first and the at least second characters, respectively, into which the data is converted during said operation of converting further comprises a third character and wherein said operation of causing further comprises, during a second time period, causing the second Braille pattern to be formed at the first set of pin members and a third Braille pattern to be formed at the second set of pin members, the third Braille pattern responsive to the third character.

11. The method of claim 9 wherein the array positioned during said operation of positioning in positioned at a support member, the method further comprising the operation of mounting the support member, together with the array of pin members, at the portable radio device.

12. In a radio device operable in a radio communication system, an improvement of user interface apparatus for facilitating use of the radio device by a visually-impaired user, said apparatus comprising:

a plurality of upstanding pin members arranged in rows and columns to form an array, each upstanding pin member separately positionable alternately in an upraised position and a recessed position, the array formed of said plurality of the upstanding pin members including at least a first set of pin members capable of forming a first Braille pattern;

a controller coupled to said plurality of upstanding pin members and to receive indications of data provided to the radio device generated during operation of the radio communication system, said controller for delectably causing positioning of the upstanding pin members of the set of pin members to form the first Braille pattern, the first Braille pattern of a character responsive to values of a portion of the data; said controller converts successive portions of the indications of the data into alphanumeric symbols and converts each of the alphanumeric symbols into a Braille pattern; wherein the successive portions of the indications of the data include a first portion, a second portion, and at least a third portion, wherein the at least the first set of pin members comprises the first set and at least a second set, and wherein said controller causes the Braille pattern formed responsive to the first portion to be displayed by the first set and the Braille pattern formed responsive to the second portion to be displayed by the second set during a first time period.

13. The user interface apparatus of claim 12 wherein said controller causes the Braille pattern formed responsive to the second portion to be displayed by the first set and the Braille pattern formed responsive to the third set to be displayed by the third set during a second time period.

14. The user interface apparatus of claim 13 wherein said controller causes the Braille pattern formed responsive to a selected portion of the indications of the data to be displayed by successive ones of the first and the at least second sets, respectively, of the pin members during successive time periods, thereby to cause scrolling of the Braille pattern across the array.

* * * * *